US008140579B2

(12) United States Patent
Li et al.

(10) Patent No.: US 8,140,579 B2
(45) Date of Patent: Mar. 20, 2012

(54) METHOD AND SYSTEM FOR SUBJECT RELEVANT WEB PAGE FILTERING BASED ON NAVIGATION PATHS INFORMATION

(75) Inventors: Jianqiang Li, Beijing (CN); Yu Zhao, Beijing (CN)

(73) Assignee: NEC (China) Co., Ltd., Beijing (CN)

(*) Notice: Subject to any disclaimer, the term of this patent is extended or adjusted under 35 U.S.C. 154(b) by 580 days.

(21) Appl. No.: 12/236,166

(22) Filed: Sep. 23, 2008

(65) Prior Publication Data
US 2009/0083244 A1  Mar. 26, 2009

(30) Foreign Application Priority Data
Sep. 25, 2007  (CN) .......................... 2007 1 0151864

(51) Int. Cl.
*G06F 7/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS
6,920,505 B2 * 7/2005 Hals et al. ...................... 709/238
7,631,035 B2 * 12/2009 Kasriel ........................... 709/203

FOREIGN PATENT DOCUMENTS
JP  2001-265774 A  9/2001
JP  2003-67419 A   3/2003
JP  2003-248696 A  9/2003

* cited by examiner

*Primary Examiner* — Isaac M Woo
(74) *Attorney, Agent, or Firm* — Sughrue Mion, PLLC

(57) ABSTRACT

Method and system to utilize the set of navigation paths of web pages as the contextual information for subject relevant web page filtering with high accuracy are provided. The method comprises the steps of: obtaining all web pages in one or more web pages collections; collecting information of the links among the obtained web pages; extracting, based on the collected links, a set of navigation paths of each of the obtained web pages; and filtering the obtained web pages based on the extracted set of navigation paths to obtain desired web pages. In some embodiments, the extraction of the navigation paths is preferably performed on the navigation links of the web pages. Therefore, the method also comprises the process for deleting non-navigation links from all the links of the web pages. Compared with the prior art, the present invention can utilize the contextual information of the web pages for web page filtering in a more sufficient way, thereby improving the accuracy and objectivity of the web page filtering.

10 Claims, 14 Drawing Sheets

| Indexing Methods | Indexing of web page P4 |
|---|---|
| Content-based or Pagetype-based | {T4, W4} |
| Link-based | {U4, T4, W4, A3} |
| Extended anchor-based | {A1+A2+A3, T4, W4} |
| Navigation path-based | {T1+A1+T2+A2+T3+A3+T4, U1+U2+U3+U4, W4, Domain_Name} |

METHOD AND SYSTEM FOR SUBJECT RELEVANT WEB PAGE FILTERING BASED ON NAVIGATION PATHS INFORMATION

FIELD OF THE INVENTION

This invention relates to information retrieval or information extraction, and especially the web page search or web page mining. More particularly, this invention provides methods and systems to utilize the set of navigation paths of web pages as the contextual information for subject relevant web page filtering with high accuracy.

BACKGROUND

With the electronic information explosion caused by Internet, a huge amount of diversified information is accumulated on the Web, and still continues to grow at a staggering rate. It is a challenging task to help net-citizens find useful information amongst this enormous information pool.

Information retrieval (IR) is the science of searching for information in a set of documents, which can further be divided into searching for a piece of information contained in documents, searching for documents themselves, searching for metadata which describe documents, or searching within databases, whether relational stand-alone databases or hypertext networked databases such as the Internet or intranets, for texts, sounds, images or data. Information extraction (IE) is a type of information retrieval whose goal is to automatically extract structured or semi-structured information from unstructured machine-readable documents. Originated from these two long-established research disciplines, web search engine (e.g., Google or Baidu) is a document retrieval system designed specifically to help find information stored on the Web, which allows one to ask for the contents that meet specific criteria (typically those containing a given word or phrase) and to retrieve a list of items that match those criteria. Recently, a new type of web search engine, i.e., vertical search engine, becomes popular on the Web. Utilizing certain information extraction or web mining technologies, it extracts structured information from a highly refined database or some websites about a specific topic to provide more accurate and valuable information to people interested in a particular area.

In all these information retrieval or information extraction solutions of the Internet era, web page filtering plays an important role inside, no matter for a general (vertical) web search engine or a specific web mining system.

Technically, the process for web page filtering is mainly composed of two steps: first, to select proper and efficient web page features for specific filtering purpose; and then, to model filtering mechanisms based on these selected features. From the aspect of selected features, the current approaches for web page filtering can be roughly classified into four categories, i.e., content based filtering, PageType based filtering, link-based filtering, and extended anchor based filtering. The four categories of web page filtering approaches will be simply introduced below.

Content-based approach: This approach derived directly from the information retrieval research [1]-[2], which is query dependent algorithm, i.e., it assigns a similarity score to each web page whenever a query is submitted. Its basic ideas is that: The words appeared in a web page are employed for retrieving the relevant web pages, i.e., higher scores are given to those web pages that contain the query terms early on in the document or in a large or boldfaced font. Based on Vector Space Model (VSM), the cosine measure can be adopted for computing the similarity between the web page and the corresponding query, and then the relevant web page filtering is realized from the similarity scores.

PageType-based approach: Considering the fact that most Internet users can recognize a certain document type to which a particular web page belongs just by casually looking at it, the conclusion that human's evaluation of a web page based on not only from its contents but also from its various format and design information is drawn. From this observation, the content of a web page together with its structural characteristics are employed in a rule-based classifier for web page type classification. The basic structural characteristics include typical pairs of a tag and strings, the size and number of inline images, the kind and number of links, and URL strings. Based on the inside features (e.g., anchor text, keywords, title, URL, etc) of similar Web page, a machine learning based method can be adopted for web page classification.

Link-based approach: Since the Web is a collection of hyperlinks, in addition to the textual content of the individual pages, the link structure of such collections contains information which can, and should, be utilized for web page filtering. Based on the assumed "random surfer" model of web browser's behavior, a link-based method is proposed for web page importance ranking. It makes use of the link structure of the Web to calculate a quality ranking for each web page, which is called PageRank score. It is computed by weighting each in-link to a page proportionally to the quality of the page containing the in-link. Since the ranking score of a web page is determined solely by a page's location in the Web's graph structure (external information of the web page), then it is query independent and can be computed ahead of the query time. At last, the combination of rank values respectively from content-based and linked-based methods is conducted to determine the final score for measuring the relativity between the web page and the subject.

Extended anchors based approach: When exploiting the hyperlink structure of the Web for web page filtering, the text appeared on the link, i.e., anchor text can also be utilized for web page ranking. The anchor text can not only be associated with the page that the link is on but also be associated with the page the link points to. Especially for the second case, anchor text often provide more accurate descriptions of web pages than the pages themselves; also it helps search non-text information, and expands the search coverage with fewer downloaded documents, such as images, programs, and databases. Based on above consideration, an extended anchor based approach for web page filtering is proposed. First, all the anchor text which appear in the web page and navigate a web browser from the top home page to each target web page is collected to build the extended anchor list. Then, the keywords appeared in the extended anchor list are employed for target web page filtering.

However, the existing web page filtering solutions have disadvantages. First, the information retrieval models adopted by content, PageType, and link based approaches treat each web page as an independent document, i.e., single page based indexing and ranking, which means that the returned page must include all the keywords in a query. They ignore the fact that the internal content of a web page is often not self-contained. Since the indexing function of such solutions indexes web pages solely based on their internal content, the web page filtering results generated from such limited content can't have a satisfied quality.

Typically, during a user's Web navigation, the contextual information of a specific web page (e.g., its domain, directory, and navigational hyperlinks from other pages to this one) are also within the mind of the user and provide an important indication on the content of the web page. However, in the prior art, the contextual information has not been utilized sufficiently.

The content based approach handles the Web as a traditional document repository, the special characteristics of the Web and web pages, such as the contextual information, are not exploited for web page filtering. The textual content of a web page is incomplete for high accurate web page filtering.

For the PageType based approach, although some structural characteristics of a web page are utilized for web page filtering, the hyperlink information in the Web is not considered inside. Since the link structure of hyperlinks collection reflects human's implicit recommendation about the targeted web page, it should make a good contribution to improve the quality of the web page filtering results.

The hyperlink information in the Web is utilized in the link based and extended anchors based approaches, but it is not exploited to its full potential. For the link-based approach, the assumed random surfer's clicking on links might not be at random. The user also utilizes the anchor text to navigate their web browsing. Therefore, besides the number of in-links and their weighting, the anchor text appeared in the navigational path also provides an important indication about the destination web page. However, in the extended anchors based approach, only the anchor text information is considered for web page filtering, the text in the page title, URL text, even the domain or host also provide important indications about the content of the web page, but are not involved.

SUMMARY OF THE INVENTION

In view of the above deficiencies in the prior art, the present invention is made to provide web page filtering method and system, which can solve the technical problems present in the prior art and improve the quality of the web page filtering results.

According to one aspect of the present invention, it is provided a method for web pages filtering, which comprises: obtaining all web pages in one or more web pages collections; collecting information of the links among the obtained web pages; extracting, based on the collected links, a set of navigation paths of each of the obtained web pages; and filtering the obtained web pages based on the extracted set of navigation paths to obtain desired web pages. The navigation path is a list of combination of URLs, anchor texts and web page titles, and the contents and domain names for web pages on the path from a top web page to a target web page. In some embodiments, the web pages collection can be a domain, a sub-domain or a directory. Preferably, in order to implement more accurate and effective web page filtering, the set of navigation paths can be extracted from only the navigation links instead of all the links among the web pages. Therefore, in some embodiments, the collected set of links need to be filtered first before or during the extraction of the set of navigation paths to get the navigation links, which are then used to obtain the desired set of navigation paths. Also preferably, the web pages filtering can be a subject relevant web pages filtering.

According to another aspect of the present invention, it is provided a system for web pages filtering, which comprises: a web page obtaining means for obtaining all web pages in one or more web pages collections; a link information collecting means for collecting information of the links among the obtained web pages; a navigation path extracting means for extracting, based on the collected links, a set of navigation paths of each of the obtained web pages; and a web page filtering means for filtering the obtained web pages based on the extracted set of navigation paths to obtain desired web pages. The navigation path is a list of combination of URLs, anchor texts and web page titles, and the contents and domain names for web pages on the path from a top web page to a target web page. In some embodiments, the web pages collection can be a domain, a sub-domain or a directory. Preferably, in order to implement more accurate and effective web page filtering, the navigation path extracting means can extract the set of navigation paths from only the navigation links instead of all the links among the web pages. Therefore, in some embodiments, the collected set of links need to be filtered first before or during the extraction of the set of navigation paths to get the navigation links, which are then used to obtain the desired set of navigation paths. Also preferably, the web page filtering means can perform a subject relevant web pages filtering on the web pages.

According to the present invention, the navigation paths of the web pages are extracted as context information for the corresponding web pages and are indexed with each of the web pages to generate an index table. As such, not only the link structure of the web pages but also all the potential texts guiding the user's navigation in the Web are exploited for high quality web page filtering.

Furthermore, one given web page might have multiple navigation paths, each of them might be designed by one author who makes his web pages point to this page. If the texts appeared in each navigation path are regarded as a kind of summarization or statement on the content of the targeted web page from a specific aspect, the multiple point views from multiple authors or contexts can be reflected through this set of navigation paths, which can guarantee the objectivity of the web page filtering.

Furthermore, since each navigation path relates to information which is not restricted to one web page but encompasses a set of related web pages, from an ontological point of view, the hyperlink graph in the Web implies many statements directly or indirectly, where the subject is the source page, predicate is the anchor text, and the object is the pointed destination page. Based on this, the semantic inference functionality can be potentially incorporated into the web page filtering process.

The foregoing and other features and advantages of the present invention can become more obvious from the following description in combination with the accompanying drawings. Please note that the scope of the present invention is not limited to the examples or specific embodiments described herein.

BRIEF DESCRIPTIONS OF THE DRAWINGS

The foregoing and other features of this invention may be more fully understood from the following description, when read together with the accompanying drawings in which:

FIG. 2B is an alternative implementation 100b for the web page filtering system shown in FIG. 2A, wherein before extracting the set of navigation paths, a predetermined subject in interest is inputted for performing a pre-filtering on the obtained set of web pages based on that;

DETAILED DESCRIPTION OF THE PREFERRED EMBODIMENTS

As described above, the contextual information of a web page can provide important information about the content of the web page, and thus plays an important role in the web page filtering. However, in the prior art, the use of the contextual information is not sufficient. Comparably, the present invention provides a method and system for web page filtering with the contextual information, which establishes the set of navigation paths of the web pages using the hyperlink information in the Web and filters the web pages using the set of navigation paths as the contextual information, thereby improving the accuracy and objectivity of the web page filtering.

The term "navigation path" used herein is denoted as the context of a given web page for indexing and is defined as a list of combination of URLs, anchors and web page titles, which can be utilized for recording all the potential browsing tracks of a web user to a targeted web page in a specific website (He/She keeps clicking on the links and uses anchor texts to guide his/her navigation in the website to find interested information). Navigation path is website dependent, i.e., each website has a set of navigation path of its own. All the navigation paths pointing to a web page provides a comprehensive description about the context of corresponding web page in the website. Each navigation path is associated with its destination web page, and each web page may have several associated navigation paths. The detailed description on the navigation path will be given below with reference to FIGS. 3A and 3B.

The term "navigation link" used herein is denoted as a link through which the author wants the page reader to be navigated to another content related page. It does not include (1) the links that each directs a "child" web page to a "parent" web page in the directory structure, (2) the links that each directs all "sibling" web pages in the same level to the same web page in the directory structure and (3) the links that each directs all web pages in the same semantic block to the same web page in the directory structure. Those links would be filtered out by some heuristic rules for navigation link selection so as to achieve a valid web page filtering. In such cases, the extraction of the set of navigation paths is performed on only the navigation links instead of all the links. As such, navigational path refers to a chain of concatenated anchor texts and titles of multiple web pages, which are connected by navigational links. It starts from the source page's title and end with the destination page's title. The detailed description on the navigation link and the navigation link filtering will be given later.

The example embodiments of the present invention will be described below with reference to the accompanying drawings. Please note that the embodiments are described here for the purpose of illustration, and the present invention should not be limited to these specific embodiments.

Figure 1:
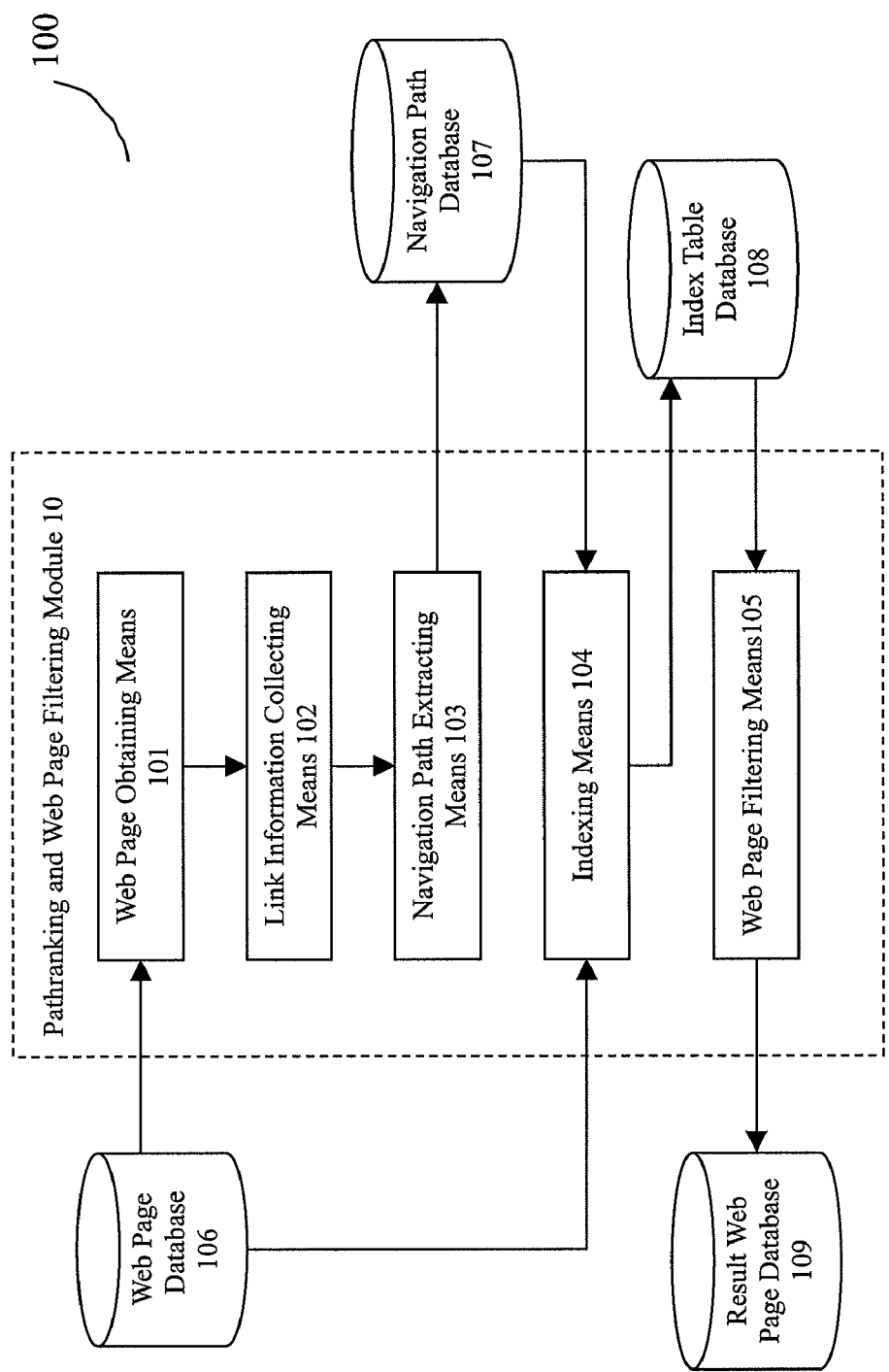
FIG. 1 is a structural block diagram for illustrating the web page filtering system 100 according to the first embodiment of the present invention.

FIG. 1 is a structural block diagram for illustrating the web page filtering system 100 according to the first embodiment of the present invention. As shown, the web page filtering system 100 mainly includes a pathranking and web page filtering module 10 for implementing the core functions of the present invention and a plurality of databases interacted with the pathranking and web page filtering module 10. The databases include a web page database 106 for storing the collection of web pages that are collected by a web crawler etc., a navigation path database 107 for storing the extracted navigation paths, an index table database 108 for storing the generated index table, and a result web page database 109 for storing the filtered result web pages. The plurality of databases are stored in a persistent storage in a computer system for providing the resources to support the performance of the pathranking and web page filtering module 10. The pathranking and web page filtering module 10 further includes a web page obtaining means 101, a link information collecting means 102, a navigation path extracting means 103, an indexing means 104 and a web page filtering means 105. Here, please note that what is stored in the web page database 106 is all the web pages in one or more web pages collections, such as domains (websites), sub-domains or directories, which are obtained from the network through a web crawlers & web page parsing module (not shown).

Figures 1A, 1B:
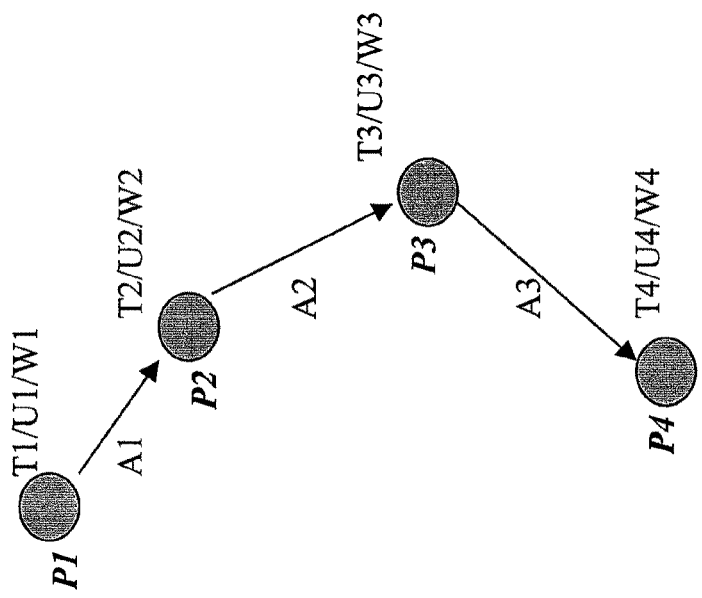
FIG. 1A shows a example navigation path of web pages.
FIG. 1B is a comparison table for illustrating the web page indexing of the navigation path based method for the structure of web pages shown in FIG. 1A compared with the web page indexing of the prior art method.

Below, the navigation path and the navigation path based indexing will be described first using FIGS. 1A and 1B. FIG. 1A shows an example navigation path of web pages, and FIG. 1B is a comparison table for illustrating the web page indexing of the navigation path based method for the structure of web pages shown in FIG. 1A compared with the web page indexing of the prior art method.

As shown in FIG. 1A, in this example, there are four web pages, i.e. pages P1, P2, P3 and P4. A1, A2 and A3 denote the anchor texts in the web pages P1, P2 and P3. Ti, Ui, Wi denote the title, URL and text content of the web page Pi respectively (i=1, 2, 3 and 4). As shown in FIG. 1B, when a content-based indexing or a pagetype-based indexing is used, the indexing of page P4 is defined as {T4, W4}, when a link-based indexing is used, the indexing of page P4 is defined as {U4, T4, W4, A3}, when an extended anchor-based indexing is used, the indexing of page P4 is defined as {A1+A2+A3, T4, W4}, and when a navigation path-based indexing according to the present invention is used, the indexing of page P4 is defined as {T1+A1+T2+A2+T3+A3+T4, U1+U2+U3+U4, W4, Domain_Name}. Therefore, it can be seen that the navigation path-based method used according to the present invention can utilize the contextual information of the web pages more sufficiently to perform the web page filtering.

Figure 1C:
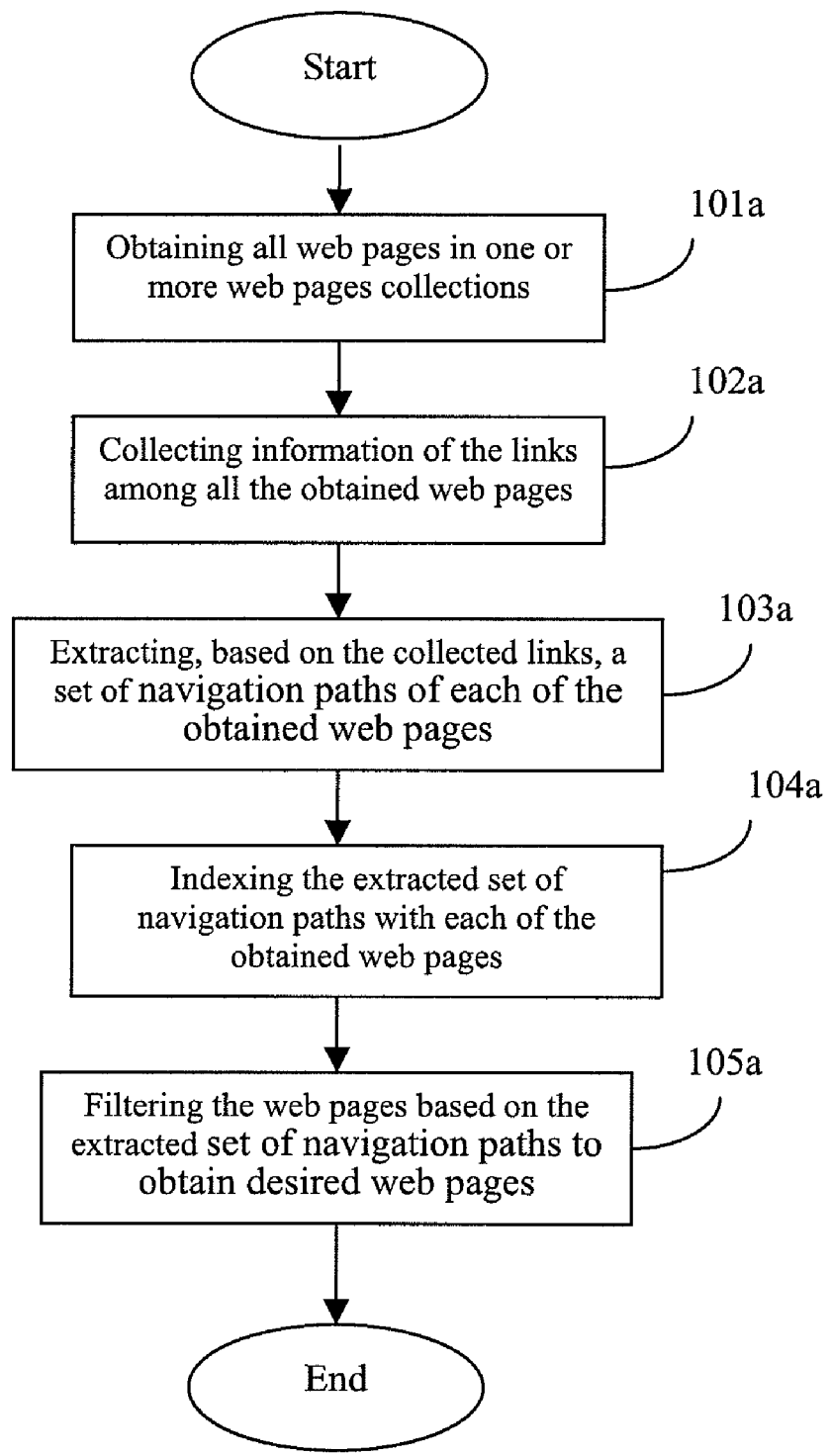
FIG. 1C is a flow chart diagram for showing the operation of the web page filtering system 100 shown in FIG. 1.

FIG. 1C is a flow chart diagram for showing the operation of the web page filtering system 100 shown in FIG. 1. First, in the step 101a, the web page obtaining means 101 obtains all web pages in one or more web pages collections from the web page database 106. As mentioned above, the web pages collection can be a domain, a sub-domain or a directory. In the following description, the domain (i.e. website) will be taken as an example to explain the present invention. However, it is obvious to those skilled in the art that the present invention is not limited to such example and can be implemented with other web page collection having an index page, such as a sub-domain or a directory. Next, in the step 102a, the link information collecting means 102 collects information of the links among all the obtained web pages. According to the collected link information, in the step 103a, the navigation path extracting means 103 can extract a set of navigation paths of each of the obtained web pages. Then in the step 104a, the indexing means 104 indexes the navigation paths in the extracted set of navigation paths with each of the obtained web pages and stores the indexing result as an index table to the index table database 108 for later processing. The indexing step described here can be achieved by using any indexing methods well-known in the art, such as reference document indexing. In particular, in the indexing step, each of the obtained web pages is indexed with the corresponding one or more sets of navigation paths to generate an index table, in which one column stores the web page id, and the other column stores the sets of navigation paths corresponding to the web page. Considering that the indexing technology is well-known in the art, its detailed description is omitted here. Next, in the step 105a, the stored indexing result is applied to the web page filtering means 105, which filters all the web pages based on the set of navigation paths that are extracted from the obtained web pages. The processes for extracting the set of navigation paths and performing the web page filtering are the key points of the present invention and will be described in more detail with reference to the accompany drawings.

As described above, the set of navigation links is a subset of all the links in a website, and does not include the links that each directs a "child" web page to a "parent" web page in the directory structure, the links that each directs all "sibling" web pages in the same level to the same web page in the directory structure and the links that each directs all web pages in the same semantic block to the same web page in the directory structure. The purpose for making such a definition is to achieve more efficient website navigation and eliminate the adverse influence on the extraction of the navigation paths, thereby improving the efficiency and the accuracy of the web page filtering. Given that, it can be conceived that in order to achieve more accurate set of navigation paths, preferably, it is possible to first filter out the navigation links from all the links of the web pages and then to extract the set of navigation paths of each of the web pages based on the navigation links. Depending on the practical applications, the navigation link filtering can be performed before or during the extraction of the set of navigation paths so as to implement a more efficient and accurate extraction of the navigation paths. Below, the extraction of the navigation paths based on the navigation links will be described in more details with respect to the second and third embodiments.

Figure 2A:
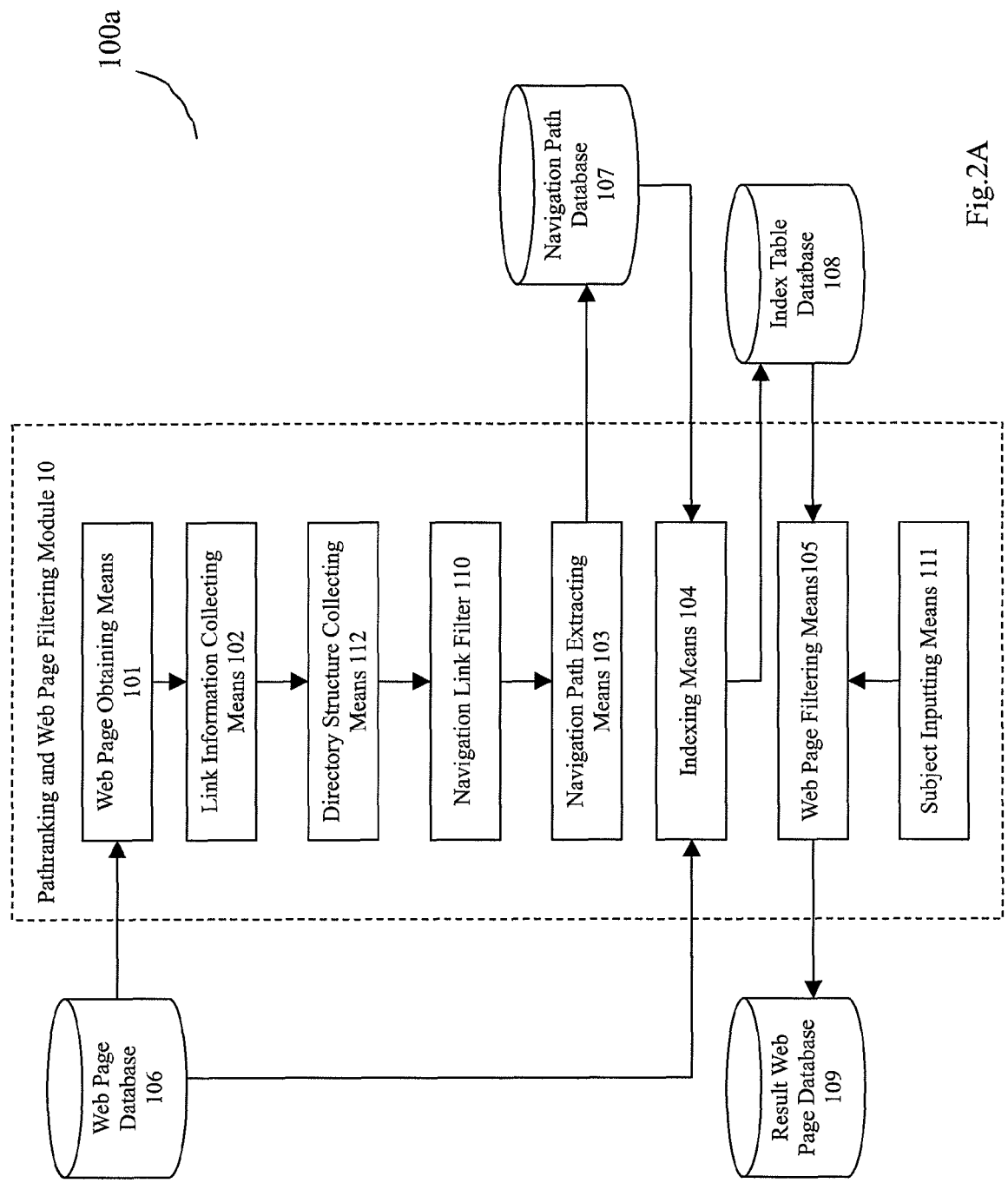
FIG. 2A is a structural block diagram for illustrating the web page filtering system 100a according to the second embodiment of the present invention, wherein before extracting the set of navigation paths, a process of link filtering is performed to get the navigation links.

FIG. 2A is a structural block diagram for illustrating the web page filtering system 100a according to the second embodiment of the present invention, wherein before extracting the set of navigation paths, a process of link filtering is performed to get the navigation links.

As shown in FIG. 2A, compared with the block diagram of FIG. 1, in addition to the other components, the web page filtering system 100a also includes a directory structure collecting means 112, a navigation link filter 110 and a subject inputting means 111. In this embodiment, in order to perform a subject relevant web page filtering, the subject inputting means 111 is coupled to the web page filtering means 105 for inputting the subject that the user is interested in. The web page filtering means 105 then performs a subject relevant filtering on the web pages based on the set of navigation paths of the web pages according to the inputted subject. However, the present invention is not limited to such a subject relevant filtering. Other filtering rules for the web pages filtering can also be used.

Figure 2B:
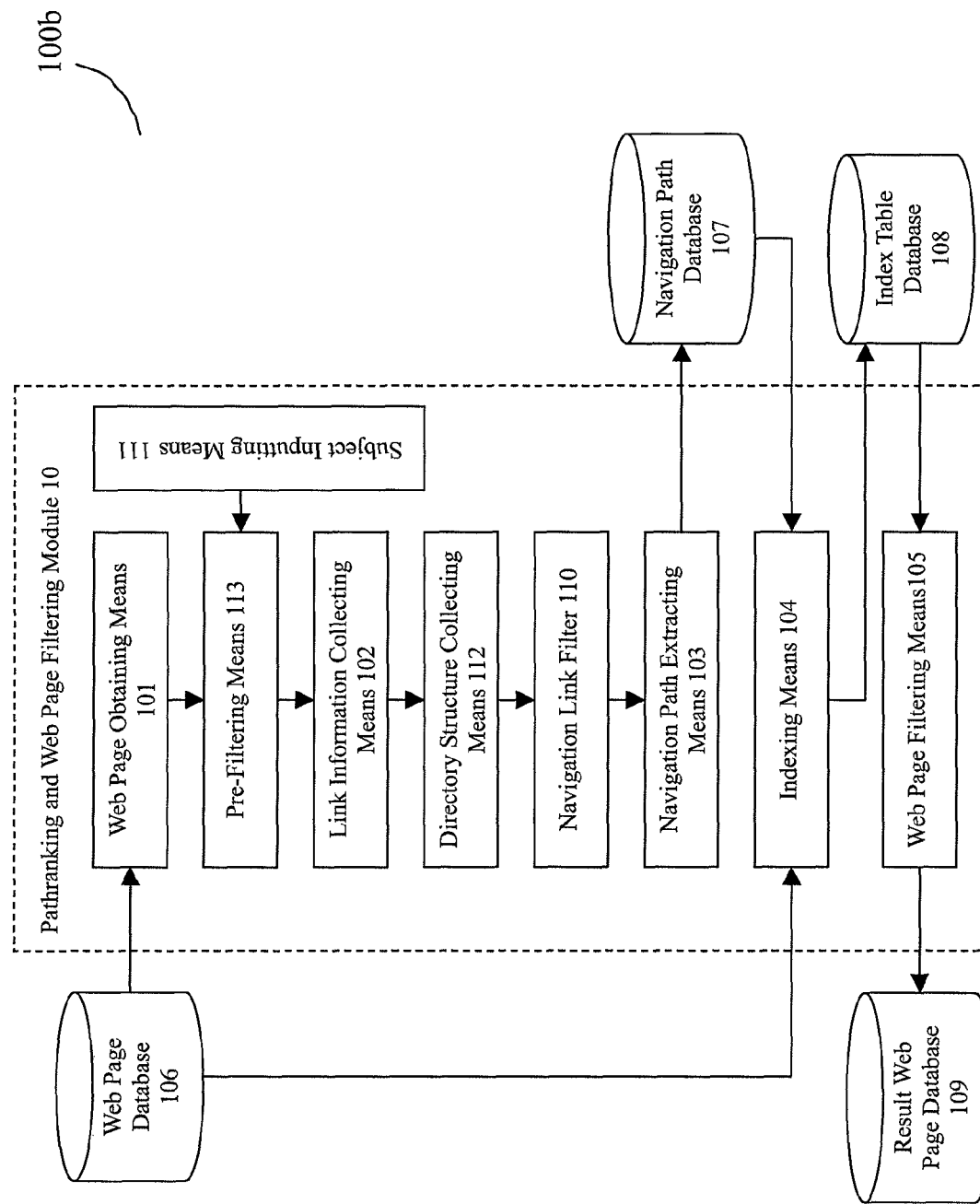

FIG. 2B is an alternative implementation 100b for the web page filtering system shown in FIG. 2A. In such a case, depending on the different applications, the subject inputting means 111 is coupled to a pre-filtering means 113 instead of the web page filtering means 105. The pre-filtering means 113 is coupled between the web page obtaining means 101 and the link information collecting means 102 and is used for performing a subject relevant pre-filtering on the obtained web pages before the information of the links among the web pages is collected. In such a case, only some of the subject relevant web pages are involved in the extraction of the set of navigation paths. It means that the first level web page filtering has already been conducted before extracting the set of navigation paths, and the navigation path-based web page filtering conducted in the web page filtering means 105 should be viewed as the second level filtering where a set of more accurate rules are applied to implement more accurate filtering. To the contrary, in the system shown in FIG. 2A, the subject that the user is interested in is inputted through the subject inputting means 111 to the web page filtering means 105. Therefore, in this example, the information on the links and the directory structures of all the obtained web pages is collected and the set of navigation paths is extracted from all the web pages, and then the web page filtering means 105 performs the corresponding subject relevant web page filtering. If only one kind of subject is concerned, the system shown in FIG. 2B has higher performance than the system shown in FIG. 2A. However, when a new subject comes, for the system shown in FIG. 2B, the navigation path extraction needs to carry out again. For the system shown in FIG. 2A, since all the navigation paths have been extracted by the navigation path extracting means 103, even if the concerned subject changed, only rerunning the process of web page filtering is enough. Therefore, in the case that the inputted subject is changed a lot, the system shown in FIG. 2A has higher efficiency.

Figure 3A:
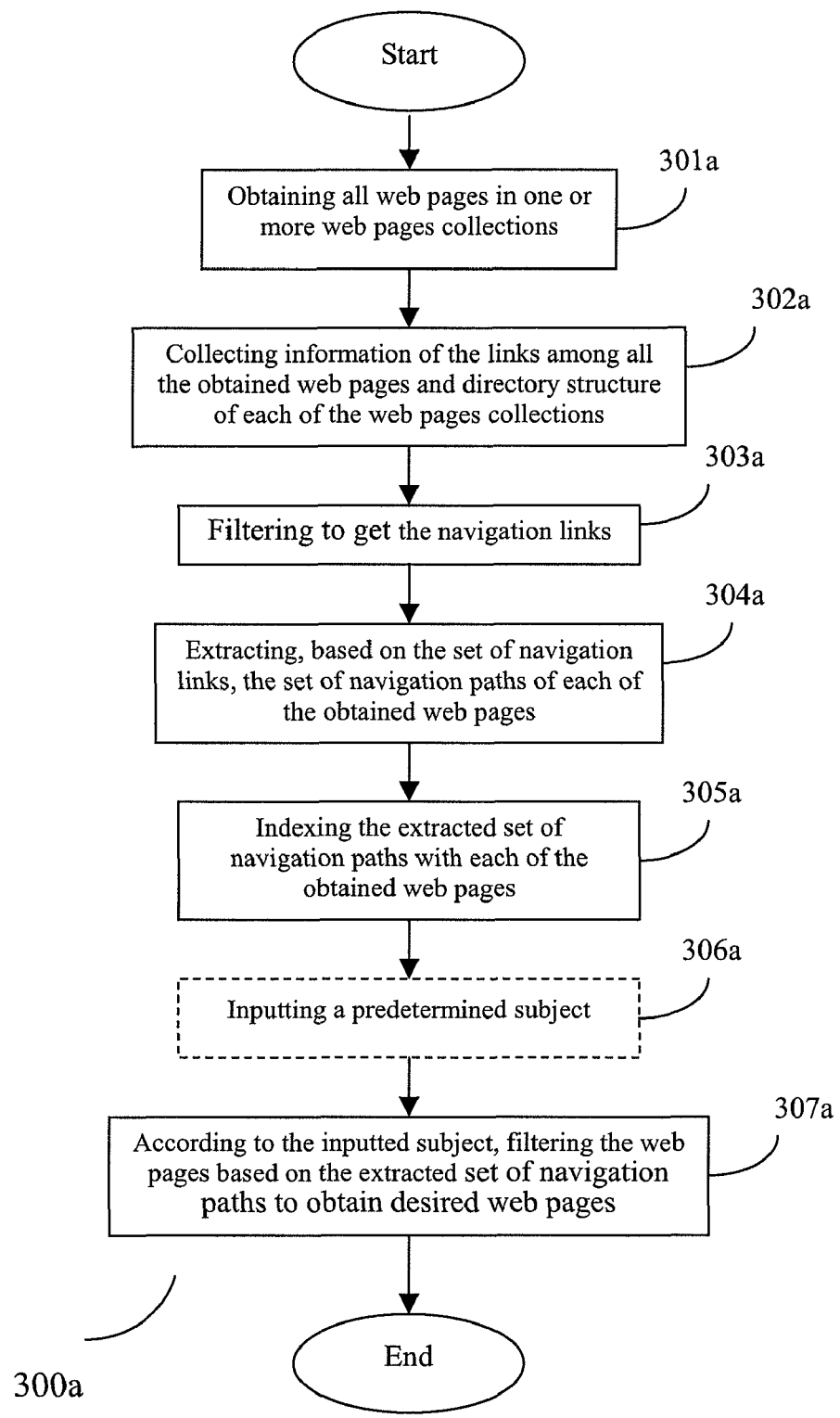
FIG. 3A is a flow chart diagram for showing the operation of the web page filtering system 100a shown in FIG. 2A.

The operations of the systems 100a and 100b shown in FIGS. 2A and 2B will be described below with reference to FIGS. 3A and 3B. FIG. 3A is a flow chart diagram for showing the operation of the web page filtering system 100a shown in FIG. 2A, and FIG. 3B is a flow chart diagram for showing the operation of the web page filtering system 100b shown in FIG. 2B.

First with reference to FIG. 3A, the process begins with obtaining all the web pages in one or more domains (step 301a). Then, in the step 302a, the information on the links and directory structures of the obtained web pages is collected. Differently from the first embodiment, in order to filter out the navigation links from all the links, it is necessary to collect the directory structure of each of the domains as reference for the web page filtering. For example, the extraction of the links of the web pages can be implemented by parsing the HTML source codes of each document. Typically, the extracted hyperlink information of the web page set is a 2-tuple set {(origin, target|origin, target are within the saying web page set, and there is at least one hyperlink from origin to target}. At the same time, the directory structure can be obtained by examining the web server's hierarchical directory structure, which is exposed by the URLs of the web documents. Extracted directory structure of the web document set is also a 2-tuple set {(parent, child)|parent, child are within the saying web document set, and parent is the parent of child in directory structure}. The methods for collecting the link relation and the directory structure are well-known in the art, and thus the description thereof is omitted here.

Next, in the step 303a, navigation links are filtered out from the collected links according to the obtained directory structures, and the set of navigation paths of the web pages is then extracted from the set of navigation links (step 304a). In the step 305a, the extracted set of navigation paths are indexed with the web pages obtained in the step 301a, and as a result, the indexing result is stored as an index table into the index table database. Then in the step 306a, a subject that the user is interested in is inputted. After inputting the subject, in the step 307a, a subject relevant web page filtering is performed on the obtained web pages according to the set of navigation paths extracted in the step 303a. Then, the process ends.

Figure 3B:
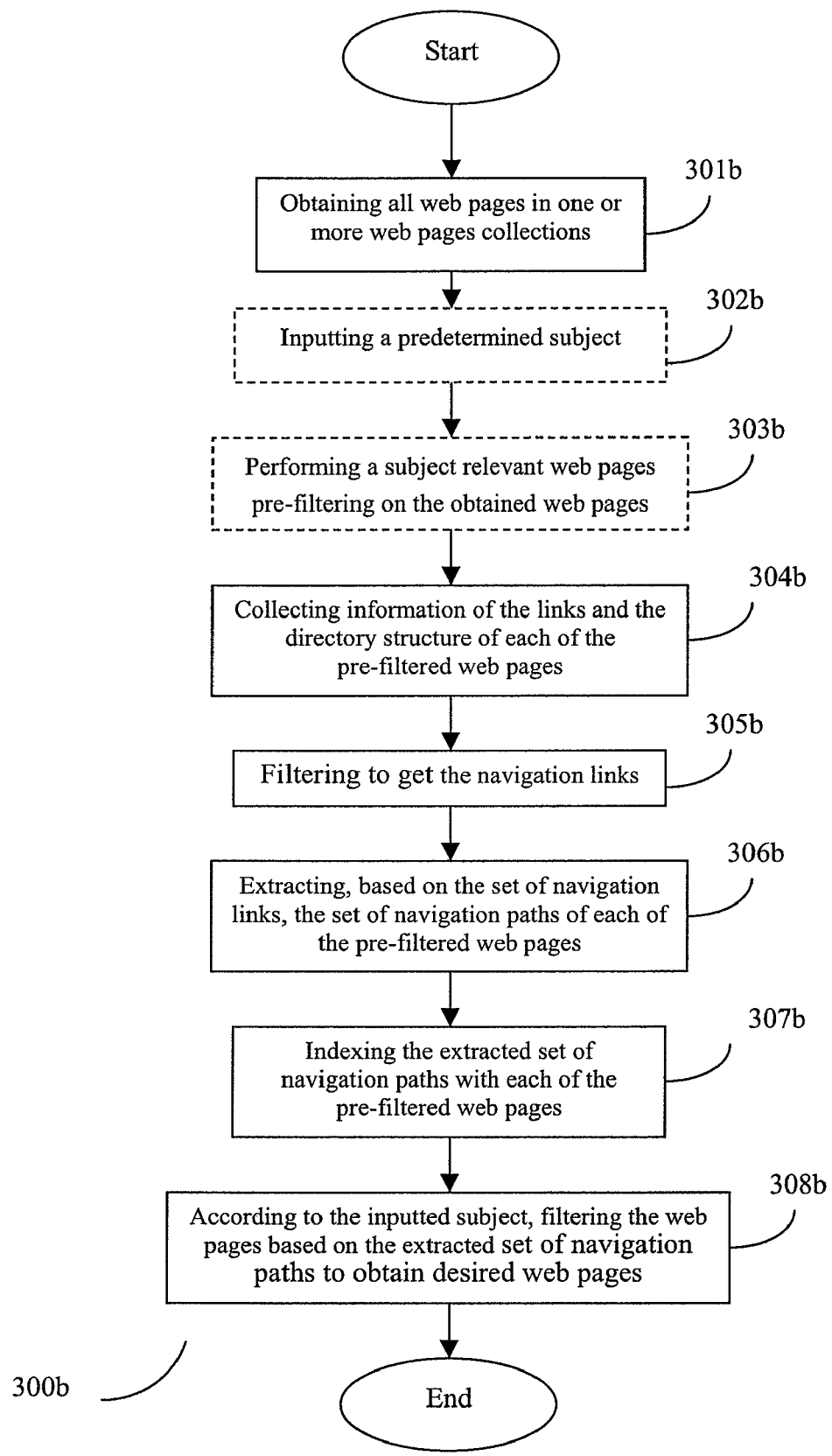
FIG. 3B is a flow chart diagram for showing the operation of the web page filtering system 100b shown in FIG. 2B.

Similarly to FIG. 3A, the process of FIG. 3B also begins with obtaining all the web pages in one or more domains (step 301b). Then, in the step 302b, a subject that the user is interested in is inputted through the subject inputting means. In the step 303b, a subject relevant web page pre-filtering is first performed on the obtained web pages according to the inputted subject to eliminate some web pages that are obviously irrelative to the inputted subject. Then in the step 304b, the links and directory structures of only the remaining web pages pre-filtered in the step 303b are collected. After that, similarly to the process of FIG. 3A, in the step 305b, navigation links are filtered out according to the collected directory structures. In the step 306b, a set of navigation paths for each of the pre-filtered web pages is extracted based on the navigation links. In the step 307b, the extracted set of navigation paths are indexed with the obtained web pages, and as a result, the indexing result is stored as an index table into the index table database. Then, in the step 308b, a subject relevant web page filtering is performed on the obtained web pages according to the extracted set of navigation paths. Then, the process ends.

Figure 4:
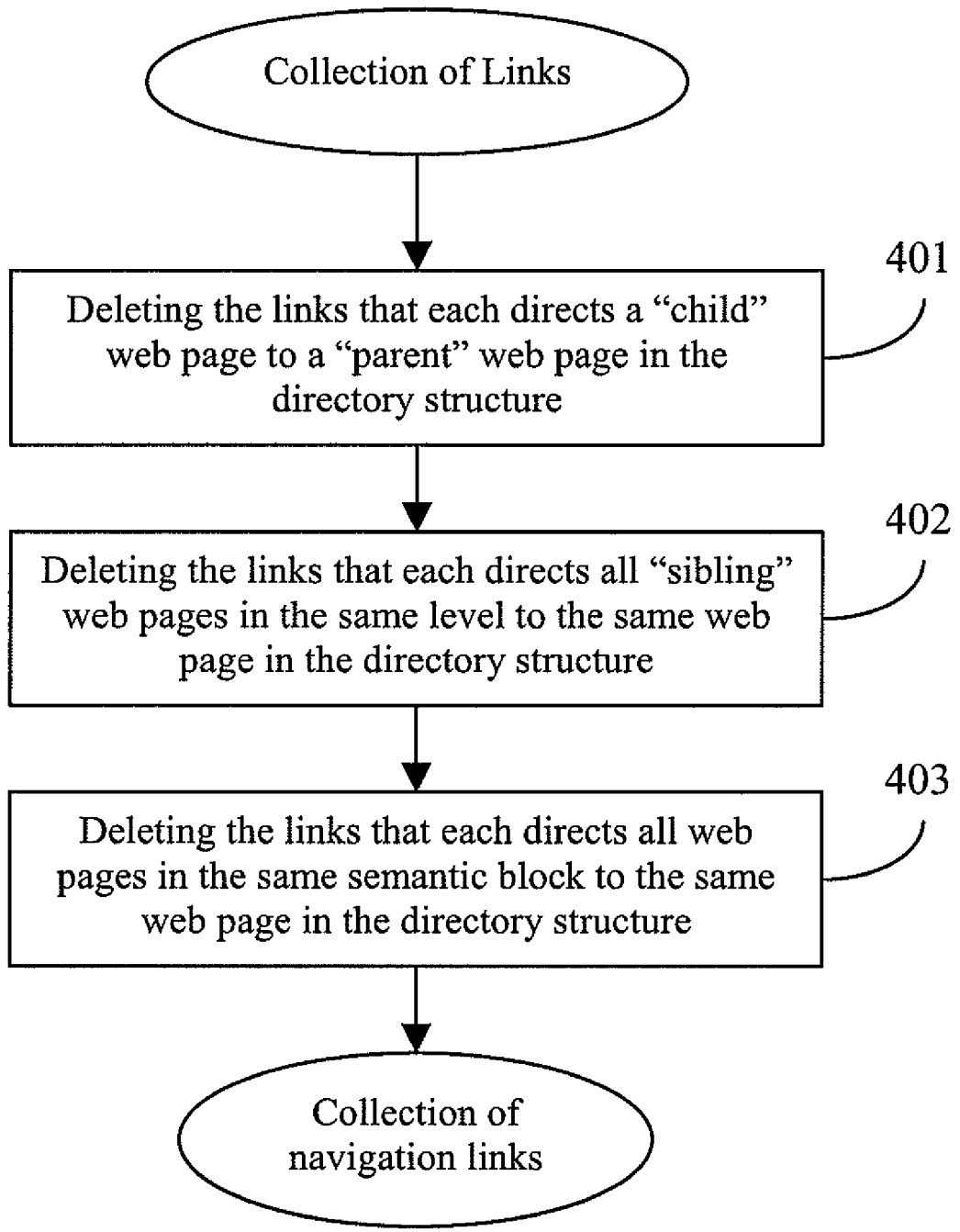
FIG. 4 is a flow chart diagram for showing the navigation link filtering process according to the second embodiment of the present invention.
Figure 5:
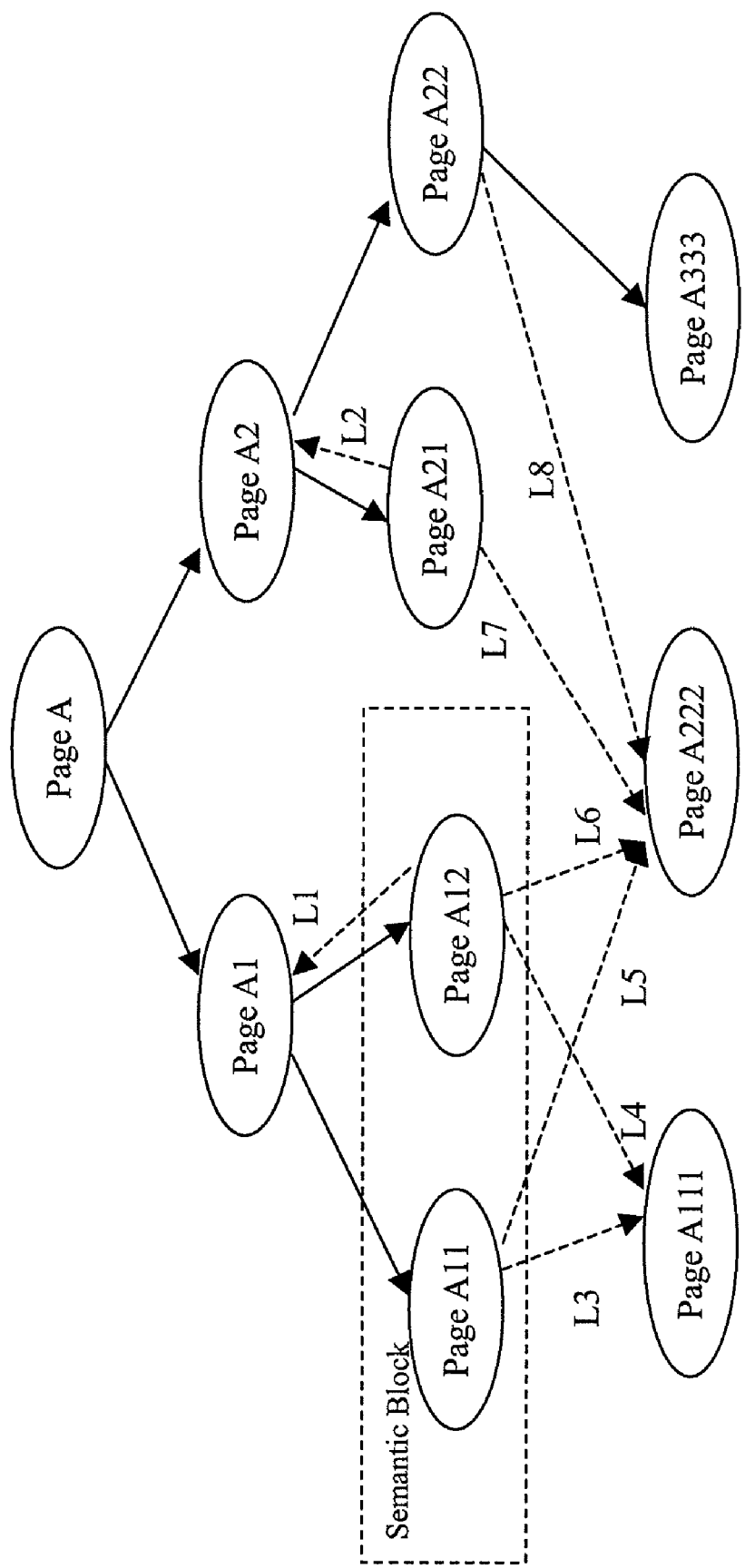
FIG. 5 is a diagram showing an example of a website structure for explaining the navigation link filtering shown in FIG. 4.
Figure 6:
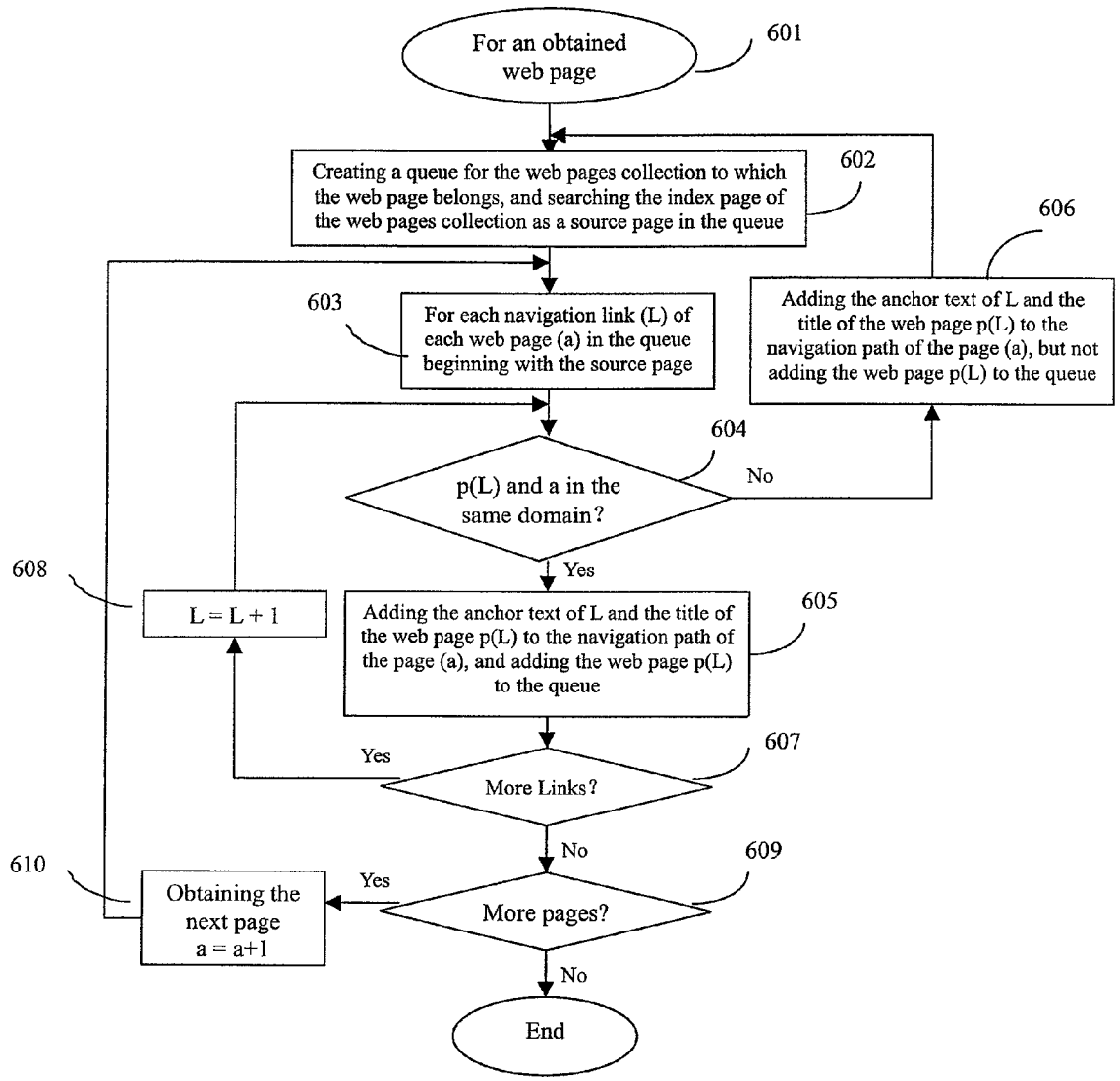
FIG. 6 is a flow chart diagram for showing the process for extracting the set of navigation paths according to the second embodiment of the present invention.

The processes for the navigation link filtering and the navigation path extraction according to the second embodiment will be described below with reference to FIGS. 4, 5 and 6. FIG. 4 is a flow chart diagram for showing the navigation link filtering process according to the second embodiment of the present invention, FIG. 5 is a diagram showing an example of a website structure for explaining the navigation link filtering shown in FIG. 4, and FIG. 6 is a flow chart diagram for showing the process for extracting the set of navigation paths according to the second embodiment of the present invention.

It can be seen from FIG. 4 that in this example, the process for navigation link filtering includes three layers of filters, i.e. the first filtering step 401, the second filtering step 402 and the third filtering step 403. In the step 401, the reverse links that each directs a "child" web page to a "parent" web page in the directory structure are first deleted. For example, in the website structure of FIG. 5, page A1 is the "parent" of page A12, page A2 is the "parent" of page A21. However, in the structure, there are a reverse link L1 directing the "child" page A12 to the "parent" page A1 and a reverse link L2 directing the "child" page A21 to the "parent" page A2. Therefore, in the first filtering step, such reverse links L1 and L2 are deleted from the collected directory structure of the website. Then, in the step 402, the links that each directs all "sibling" web pages in the same level to the same web page in the directory structure are deleted. For example, in FIG. 5, pages A11, A12, A21 and A22 are in the same level, and point to the same page A222 through links L5, L6, L7 and L8 respectively. In such a case, in the second filtering step, the links L5, L6, L7 and L8 are deleted. In the step 403, the links that each directs all web pages in the same semantic block to the same web page in the directory structure are deleted. For example, in FIG. 5, assume that pages A11 and A12 in the same level are located in the same semantic block and point to the same page A111 through links L3 and L4. In the third filtering step, links L3 and L4 are deleted. As such, by deleting all the non-navigation links, the set of navigation links are obtained.

Next, with reference to FIG. 6, the process for extracting the set of navigation paths for each of the obtained web pages will be described. First, in the step 601, for each of the obtained web pages, a web page queue for the domain (e.g. website) that the web page belongs to is established and the index page of the domain is searched as a source page of the web page queue for the domain (step 602). Then, in the step 603, beginning from the source page, all the navigation links of each web page in the queue are processed. Here, please note that all the non-navigation links have been deleted with the previous navigation link filtering, and thus only the remaining navigation links will be processed. For a navigation link L of web page a, in the step 604, it is determined first whether the web page p(L) the link L points to is in the same domain as page a. If so, in the step 605, the anchor text of L and the title of the web page p(L) are added to the navigation path of the page a, and the web page p(L) link L points to is added to the queue of the domain. If it is determined that pages p(L) and a are not in the same domain, in the step 606, the anchor text of L and the title of the web page p(L) are added to the navigation path of the page a, but the web page p(L) link L points to is not added to the queue of the domain. Then, the process returns to the step 602, where to research the index page of the new domain the web page p(L) belongs to as a source page and establish a web page queue for the domain. Next, with respect to the new domain, the operations in the step 602 and later steps are repeated. After the step 605, it is determined whether there are more navigation links for the web page being considered in the step 607. If so, the above process will be repeated with respect to the next navigation link L=L+1 (step 608). If there is no other navigation links, in the step 609, it is further determined whether there are more web pages to be processed in the queue of the domain. If so, the next page is extracted (step 610) and the process returns to the step 603 for processing the navigation links of the newly obtained web page. If there are no more web pages, the process ends.

The foregoing is related to the second embodiment of the present invention, wherein the set of links are filtered to get the navigation links before the extraction of the navigation paths, and based on the filtered navigation links, the desired set of navigation paths are extracted. In this way, the accuracy of the web page filtering can be improved. Below, the third embodiment of the present invention will be described with reference to FIGS. 7 and 8.

Figure 7:
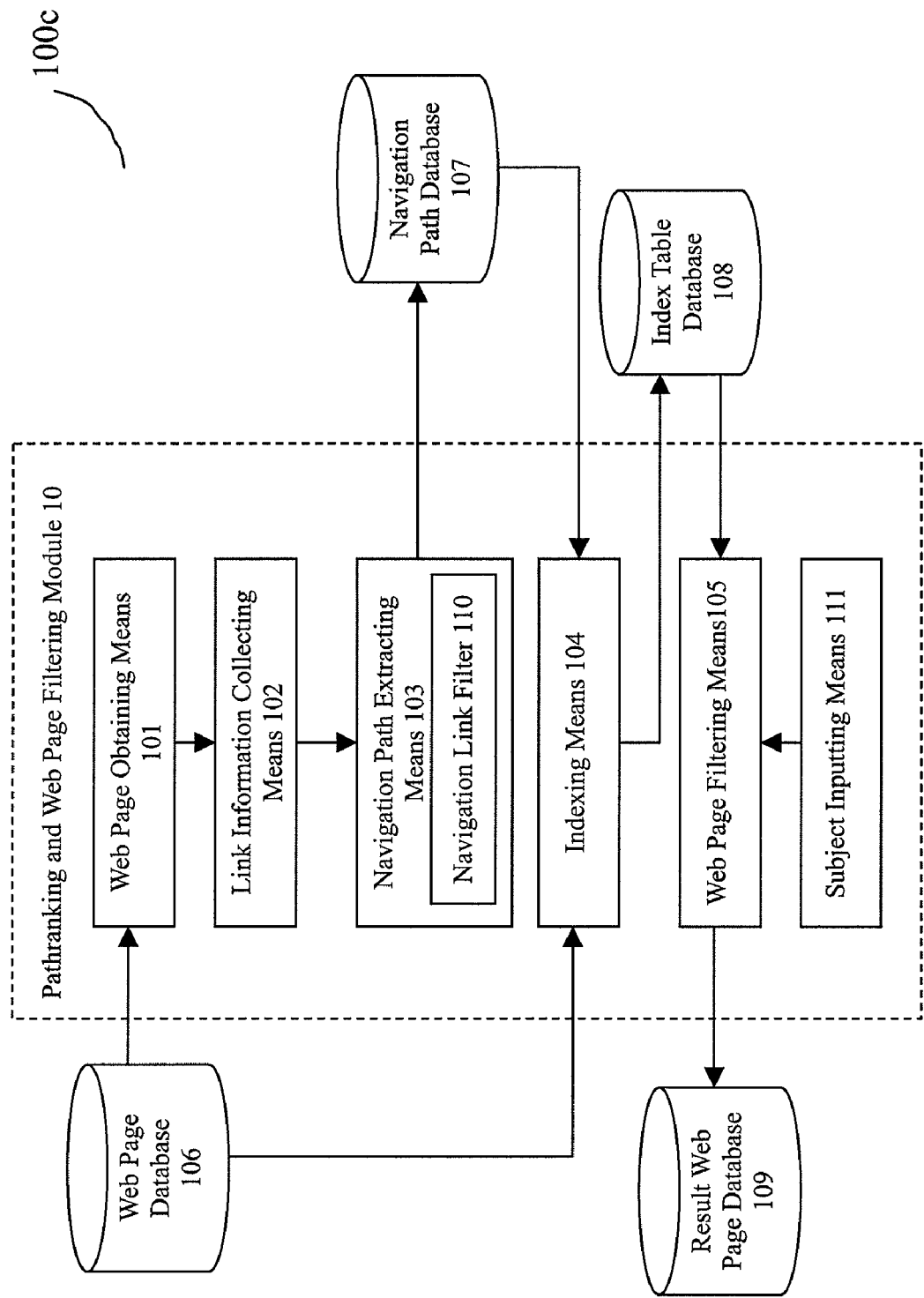
FIG. 7 is a structural block diagram for illustrating the web page filtering system 100c according to the third embodiment of the present invention, wherein the navigation link filtering is performed during the process for extracting the set of navigation paths.

FIG. 7 is a structural block diagram for illustrating the web page filtering system 100c according to the third embodiment of the present invention. Compared with the second embodiment shown in FIGS. 2A and 2B, the difference of the web page filtering system 100c is that the navigation link filter 110 is included in the navigation path extracting means 103 to filter out the navigation paths during the navigation path extracting process, not before the navigation path extracting process as shown in the second embodiment. The other components of the system 100c shown in FIG. 7 are similar to that in the second embodiment, and thus the description thereof is omitted here. Furthermore, it should be noted that although the subject inputting means 111 is coupled to the web page filtering means 105 in FIG. 7, like the second embodiment, the subject inputting means 111 can also be coupled to the pre-filtering means 113, which is coupled between the web page obtaining means 101 and the link information collecting means 102, for implementing a subject relevant pre-filtering on the obtained web pages before the extraction of the navigation paths, as shown in FIG. 2B.

Figure 8:
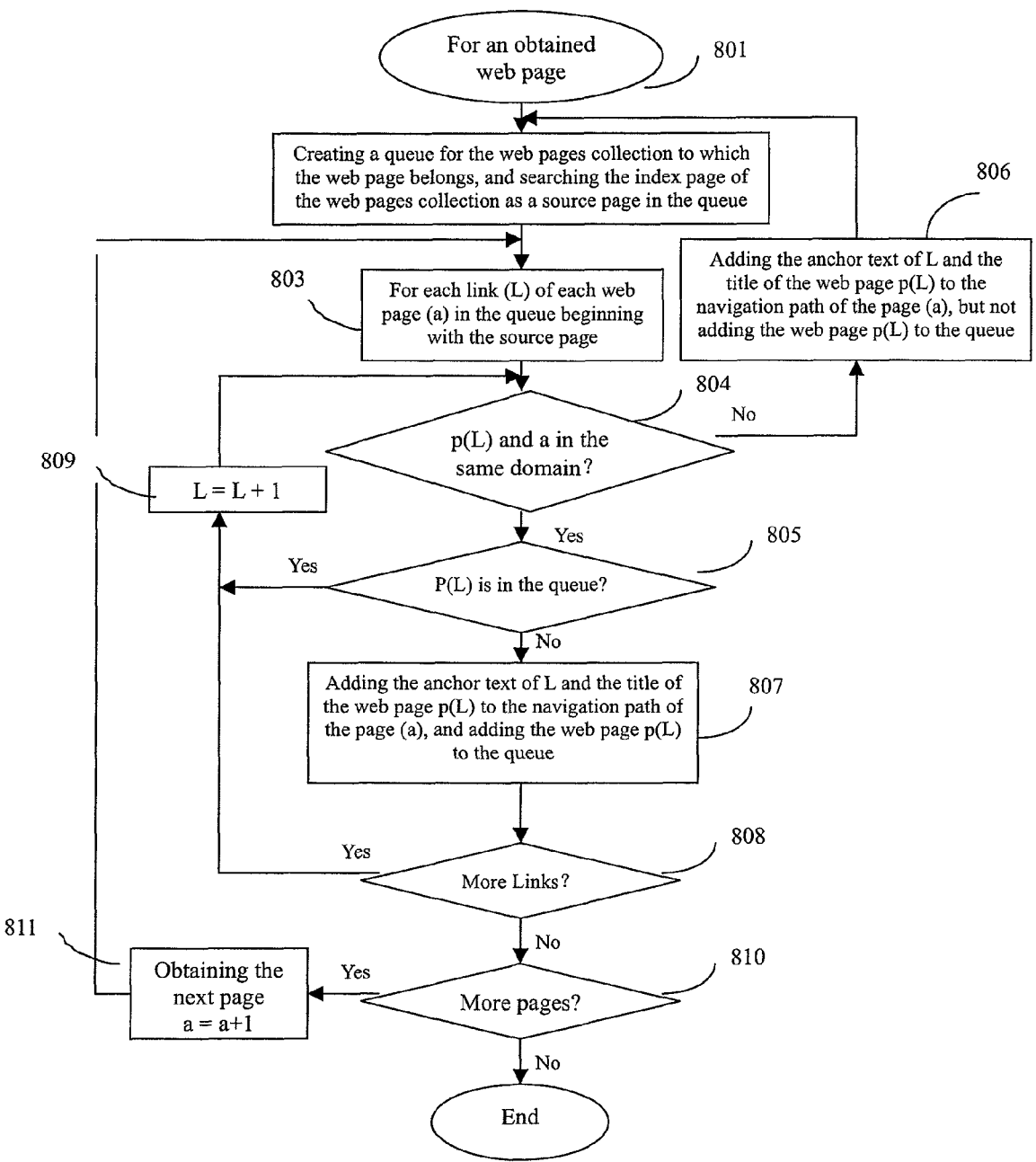
FIG. 8 is a flow chart diagram for showing the process for extracting the set of navigation paths according to the third embodiment of the present invention.

FIG. 8 is a flow chart diagram for showing the process for extracting the set of navigation paths performed by the web page filtering system 100c according to the third embodiment of the present invention. Except for the navigation path extraction process, other steps of the third embodiment are similar to that of the second embodiment, and so the process described above with reference to FIGS. 3A and 3B can be referred to and the detailed description thereof is omitted here. The process shown in FIG. 8 begins with the step 801, where for each of the obtained web pages, in the step 802, a web page queue for the domain (e.g. website) that the web page belongs to is established and the index page of the domain is searched as a source page of the web page queue for the domain. Then, in the step 803, beginning from the source page, all the links of each web page in the queue are processed. Here, please note that differently from the first embodiment, the links of the web pages are not filtered before the extraction of the navigation paths. Therefore, in this embodiment, all the links of each web page will be considered and processed. Then, for a link L of web page a, in the step 804, it is determined first whether the web page p(L) the link L points to is in the same domain as page a. If so, the process proceeds to the step 805, where it is determined whether the link L is a navigation link. If the determination in the step 804 indicates that the web page p(L) the link L points to is not in the same domain as the web page a, in the step 806, the anchor text of L and the title of the web page p(L) are added to the navigation path of the page a, but the web page p(L) link L points to is not added to the queue of the domain. Then, the process returns to the step 802, where to research the index page of the new domain the web page p(L) belongs to as a source page and establish a web page queue for the new domain. Next, with respect to the new domain, the operations in the step 802 and later steps are repeated. In the step 804, when it is determined that the web page p(L) is in the same domain as the web page a, it is further determined whether the web page p(L) has already been in the queue of the domain (step 805), that is, whether the web page p(L) has already been considered in the previously extracted navigation paths. If so, the link L is not treated as a navigation link, and the process proceeds to the step 809 to repeat the process described above for the next link L=L+1. To the contrary, if it is determined in the step 805 that the web page p(L) has not been considered yet, the link L is determined as a navigation link, and the process proceeds to the step 807, where the anchor text of L and the title of the web page p(L) are added to the navigation path of the page a, and the web page p(L) link L points to is added to the queue of the domain. Then, in the step 808, it is determined whether there are more links. If so, the above process will be repeated with respect to the next link L=L+1 (step 809). If there is no more links, in the step 810, it is further determined whether there are more web pages to be processed in the queue of the domain. If so, the next page is extracted (step 811) and the process returns to the step 603 for processing all the links of the newly obtained web page. If there are no more web pages, the process ends.

The processes for extracting the set of navigation paths based on the navigation links according to the second and the third embodiments have already been described above. Since the navigation paths play a key role in the subsequent web page filtering, the extraction method needs to be designed carefully to guarantee its quality and then the quality of final web page filtering results. Some further modifications might be made to improve the present embodiment. It can be understood for those skilled in the art that the processes for filtering the navigation links and extracting the navigation paths are not limited to the two embodiments described here. Other filtering and extracting methods can also be designed and utilized according to the practical applications.

Return to FIGS. 3A and 3B, after extracting the set of navigation paths, the extracted set of navigation paths are indexed with the web pages in the collected web page collections. Then, the indexing result will be used for a subject relevant web page filtering. Next, an example of the subject relevant web page filtering process will be given with reference to FIG. 9.

As described above, the user can input a predetermined subject that he/she is interested in through the subject inputting means 111. Typically, for a web page, if its URL, its page title or one of the anchor texts directing to it includes subject related keywords, this web page is judged as a definite subject relevant page. If a web page is a definite subject relevant page, all the pages which can be navigated from the definite subject relevant page through navigation paths are considered as possible subject relevant pages. And, closer to the definite subject relevant page a web page is along the navigation path, higher the possibility that the web page is also a subject related web page. Thus, in order to utilize the navigation path information, several subject related ontology terms (subject related keywords) should be prepared in advance, and in the mean time, subject irrelative ontology terms (the keywords related to other subjects except for the saying subject) could also be predefined optionally for improving accuracy. For example, within a company website, if the product (subject) related web pages are needed to be retrieved, product related keywords may be like "product", "solution", "service" and so on, while product irrelative keywords are the keywords related to other subjects which might exist in the company websites, such as "news", "forum", "support", etc.

Figure 9:
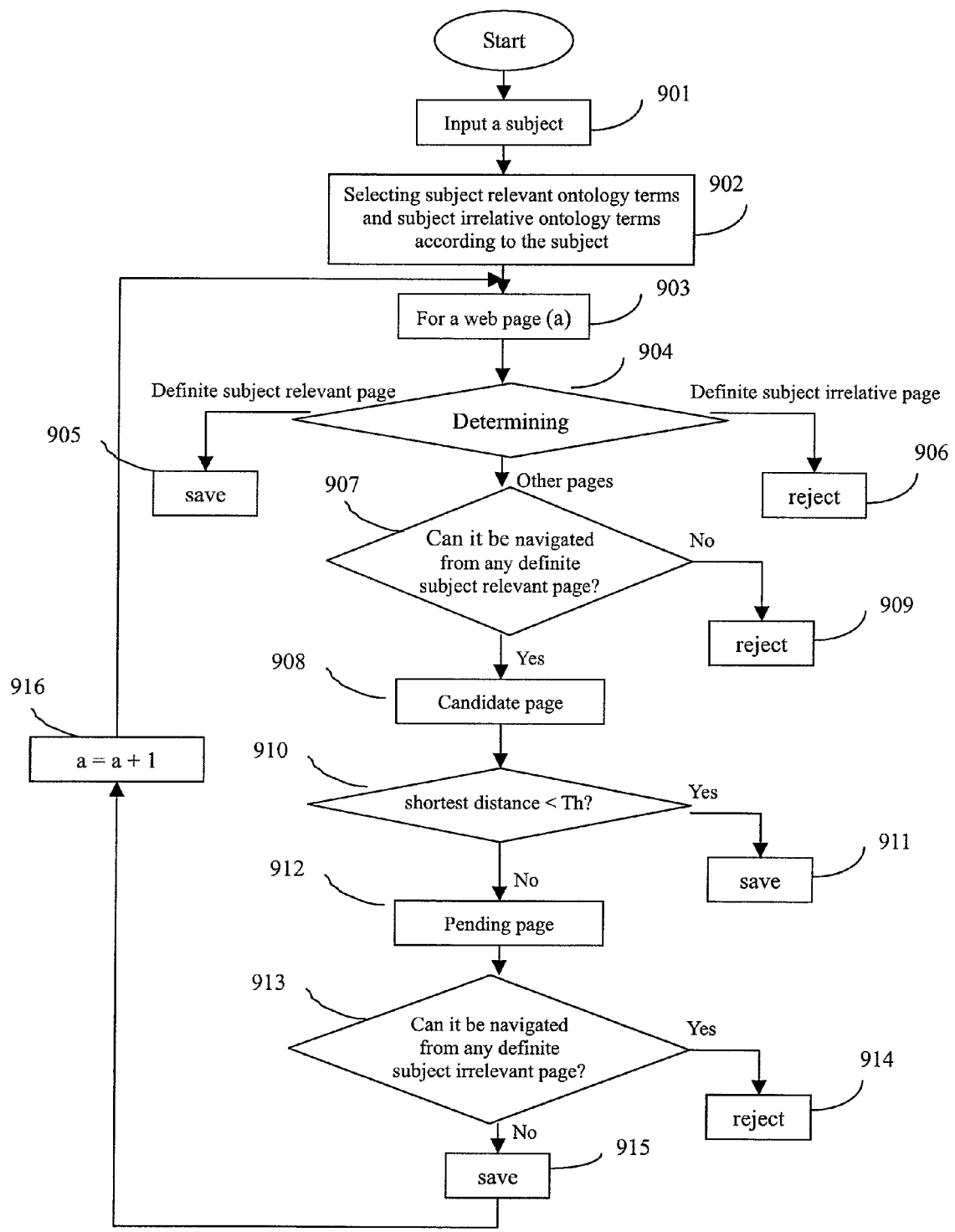
FIG. 9 is a flow chart diagram for showing the subject relevant web page filtering process of the web page filtering system according to the present invention.

With reference to FIG. 9, in the step 901, a subject that the user is interested in is inputted first through the subject inputting means 111. Then in the step 902, subject relevant ontology terms and subject irrelative ontology terms are selected according to the inputted subject. In the step 903, for a web page a in the obtained set of web pages, it is determined whether the web page a is a definite subject relevant page or a definite subject irrelative page based on the selected ontology terms (step 904). The determination method here can employ any of the similarity measurement technologies well-known in the art. If it is determined in the step 904 that the web page a is a definite subject relevant page, the web page a is saved (step 905). If it is determined in the step 904 that the web page a is a definite subject irrelative page, the web page a is rejected (step 906). If the type of the web page a cannot be determined in the step 904, the process proceeds to the step 907. In the step 907, it is determined whether the web page a can be navigated from any definite subject relevant page. If so, the web page a is viewed as a candidate page (step 908). Otherwise, the web page a is rejected (step 909). After determining that the web page a is a candidate page, in the step 910, it is further determined whether the shortest distance between the candidate page a and any definite subject relevant page along navigation paths is shorter than a pre-defined threshold Th. If so, the web page a is determined as a subject relevant page and is saved (step 911). If the shortest distance is not shorter than the threshold Th, in the step 912, the web page a is viewed as a pending page. For any pending page, in the step 913, it is further determined whether the web page a can be navigated from any definite subject irrelative page through navigation paths. If so, this page would be rejected (step 914), otherwise, the web page a is determined as a subject relevant page and is saved (step 915). Then, for the next web page in the obtained web page collection, the above-mentioned process will be repeated (step 916) until all the web pages have been processed.

It should be noted that the process shown in FIG. 9 is only an example of the web page filtering according to the present invention, and the present invention is not limited to that. It is easy to conceive that in other applications, the filtering rules can be designed according to different applications. Also, the web page filtering method is not limited to the subject relevant web page filtering described above.

Figure 10:
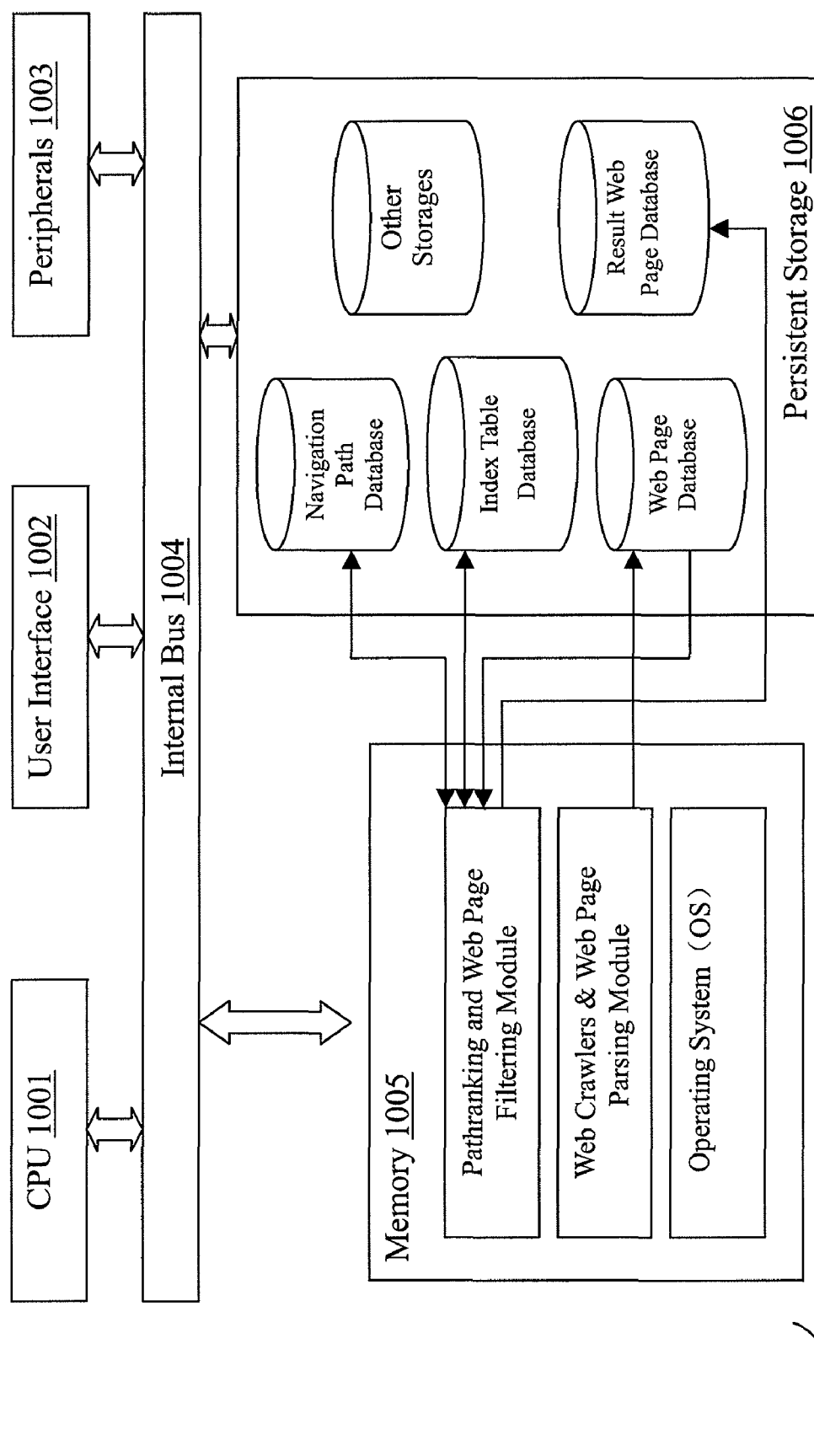
FIG. 10 is a schematic block diagram of the computer system that is used to implement the present invention.

FIG. 10 is a schematic block diagram of the computer system 1000 that is used to implement the present invention. As shown, the computer system 1000 includes a CPU 1001, a user interface 1002, the peripherals 1003, a memory 1005, a persistent storage 1006 and an internal bus 1004, which connects the foregoing components with each other. The memory 1005 further includes a pathranking and web page filtering module, a web crawlers & web page parsing module and an operating system (OS) etc. The present invention is mainly related to the pathranking and web page filtering module, which is, for example, the pathranking and web page filtering module 10 shown in FIG. 1. The web crawlers & web page parsing module can be used for obtaining web pages from the network and storing the web pages in a web page database. The persistent storage 1006 stores the various databases related to the present invention, such as the web page database 106, the navigation path database 107, the index table database 108, the result web page database 109 etc.

The navigation path based web page filtering systems and the operations thereof according to the first and second embodiments have been described above with reference to the accompany drawings. According to the above description, it can be seen that the navigation paths of a web page are extracted as the contextual information of the web page. The set of navigation paths are then indexed with the web pages and stored as an index table. In this way, not only the link structure but also all the potential texts guiding the user's navigation in the Web are exploited for high quality web page filtering. Furthermore, one given web page might have multiple navigation paths, each of them might be designed by one author who makes his web pages point to this page. If the texts appeared in each navigation path are regarded as a kind of summarization or statement on the content of the targeted web page from a specific aspect, the multiple point views from multiple authors or contexts can be reflected through this set of navigation paths, which can guarantee the objectivity of the web page filtering.

The specific embodiments of the present invention have been described above with reference to the accompanying drawings. However, the present invention is not limited to the particular configuration and processing shown in the accompanying drawings. In the above embodiments, several specific steps are shown and described as examples. However, the method process of the present invention is not limited to these specific steps. Those skilled in the art will appreciate that these steps can be changed, modified and complemented or the order of some steps can be changed without departing from the spirit and substantive features of the invention.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine-readable medium or transmitted by a data signal embodied in a carrier wave over a transmission medium or communication link. The "machine-readable medium" may include any medium that can store or transfer information. Examples of a machine-readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as the Internet, Intranet, etc.

Although the invention has been described above with reference to particular embodiments, the invention is not limited to the above particular embodiments and the specific configurations shown in the drawings. For example, some components shown may be combined with each other as one component, or one component may be divided into several subcomponents, or any other known component may be added. The operation processes are also not limited to those shown in the examples. Those skilled in the art will appreciate that the invention may be implemented in other particular forms without departing from the spirit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for web pages filtering, comprising:
    obtaining all web pages in one or more web pages collections;
    collecting information of links among the obtained web pages;
    collecting a directory structure of each of the web pages collections;
    deleting all non-navigation links from the collected links of web pages in a web pages collection according to its directory structure to get a set of navigation links; and
    extracting, based on the set of navigation links, a set of navigation paths of each of the obtained web pages, wherein a navigation path of the set of navigation paths is denoted as context of a web page for indexing and includes a list of combination of URLs, anchors and web page titles for web pages on the navigation path; and
    filtering the obtained web pages based on the extracted set of navigation paths to obtain desired web pages.

2. The method according to claim 1, wherein the non-navigation links are at lease one of the following three kinds of links:
    the links that each directs a "child" web page to a "parent" web page in the directory structure;
    the links that each directs all "sibling" web pages in the same level to the same web page in the directory structure; and the links that each directs all web pages in the same semantic block to the same web page in the directory structure.

3. The method according to claim 1, wherein extracting the set of navigation paths comprises:
(a) selecting a Web page from the obtained web pages;
(b) creating a queue for the web pages collection to which the selected web page belongs, and searching the index page of the web pages collection as a source page in the queue; and
(c) with respect to each navigation link of each web page in the queue beginning with the source page:
if the web page that the navigation link points to and the web page in interest are in the same web pages collection, adding the anchor text corresponding to the navigation link and the title of the web page that the navigation link points to the navigation path of the web page in interest, adding the web page that the navigation link points to the queue of the web pages collection to which the web page in interest belongs, and returning to step (c) with respect to the next navigation link of the web page in interest; otherwise
if the web page that the navigation link points to and the web page in interest are not in the same web pages collection, adding the anchor text corresponding to the navigation link and the title of the web page that the navigation link points to the navigation path of the web page in interest, and returning to step (b) to create a queue for the web pages collection to which the web page that the navigation link points to belongs, and searching the index page of the web pages collection as a source page to repeat the processing of step (c).

4. A method for web pages filtering, comprising:
obtaining all web pages in one or more web pages collections;
collecting information of the links among the obtained web pages;
extracting, based on the collected links, a set of navigation paths of each of the obtained web pages, wherein a navigation path of the set of navigation paths is denoted as context of a web page for indexing and includes a list of combination of URLs, anchors and web page titles for web pages on the navigation path; and
filtering the obtained web pages based on the extracted set of navigation paths to obtain desired web pages, wherein extracting the set of navigation paths comprises:
(a) selecting a web page from the obtained web pages;
(b) creating a web pages queue for the web pages collection to which the selected web page belongs, and searching the index page of the web pages collection as a source page in the queue; and
(c) with respect to each link of each web page in the queue beginning with the source page:
if the web page that the link points to and the web page in interest are in the same web pages collection, determining whether the web page that the link points to has already existed in the queue of the web pages collection,
if the web page that the link points to is not in the queue of the web pages collection, adding the anchor text corresponding to the link and the title of the web page that the link points to the navigation path of the web page in interest,
if the web page that the link points to is already in the queue of the web pages collection, returning to step (c) to consider the next link of the web page in interest; otherwise if the web page that the link points to and the web page in interest are not in the same web pages collection, adding the anchor text corresponding to the link and the title of the web page that the link points to the navigation path of the web page in interest, and returning to step (b) to create a queue for the web pages collection to which the web page that the link points to belongs, and searching the index page of the web pages collection as a source page to repeat the processing of step (c).

5. A method for web pages filtering, comprising:
obtaining all web pages in one or more web pages collections,
collecting information of links among the obtained web pages;
extracting, based on the collected links, a set of navigation paths of each of the obtained web pages, wherein a navigation path of the set of navigation paths is denoted as context of a web page for indexing and includes a list of combination of URLs, anchors and web page titles for web pages on the navigation path; and
filtering the obtained web pages based on the extracted set of navigation paths to obtain desired web pages,
wherein filtering the web pages is a subject relevant web pages filtering, and the method further comprises:
inputting a predetermined subject after extracting the set of navigation paths; and
filtering, according to the predetermined subject, the obtained web pages based on the extracted set of navigation paths to obtain the desired web pages,
wherein performing the subject relevant web pages filtering comprises:
selecting subject relevant ontology terms and subject irrelative ontology terms according to the predetermined subject;
for each of the web pages, determining, according to the selected subject relevant ontology terms and subject irrelative ontology terms, whether the web page is a definite subject relevant page or a definite subject irrelative page;
saving all the definite subject relevant pages as the desired web pages and rejecting all the definite subject irrelative pages; and
for each of the other web pages, which is neither a definite subject relevant page nor a definite subject irrelative page:
if the web page cannot be navigated from any definite subject relevant page through the navigation paths, rejecting the web page; otherwise regarding the web page as a candidate page,
if the shortest distance between the candidate page and any definite subject relevant page through the navigation paths is shorter than a predetermined threshold, saving the web page as the desired web pages; otherwise regarding the web page as a pending page;
if the pending page can be navigated from any definite subject irrelative page through the navigation paths, rejecting the web page; otherwise saving the web page as the desired web pages.

6. A system for web pages filtering, comprising:
a web page obtaining means for obtaining all web pages in one or more web pages collections,
a link information collecting means for collecting information of the links among the obtained web pages;
a navigation path extracting means for extracting, based on the collected links, a set of navigation paths of each of the obtained web pages, wherein a navigation path of the set of navigation paths is denoted as context of a web page for indexing and includes a list of combination of URLs, anchors and web page titles for web pages on the navigation path;
a web page filtering means for filtering the obtained web pages based on the extracted set of navigation paths to obtain desired web pages;
a directory structure collecting means for collecting a directory structure of each of the web pages collections; and
a navigation link filter for deleting all non-navigation links from the collected links of web pages in a web pages collection according to its directory structure to get a set of navigation links;
wherein the navigation path extracting means extracts, based on the set of navigation links, the set of navigation paths of each of the obtained web pages.

7. The system according to claim 6, wherein the non-navigation links are at lease one of the following three kinds of links:
the links that each directs a "child" web page to a "parent" web page in the directory structure;
the links that each directs all "sibling" web pages in the same level to the same web page in the directory structure; and
the links that each directs all web pages in the same semantic block to the same web page in the directory structure.

8. The system according to claim 6, wherein the navigation path extracting means is configured for:
(a) selecting a web page from the obtained web pages;
(b) creating a queue for the web pages collection to which the selected web page belongs, and searching the index page of the web pages collection as a source page in the queue; and
(c) with respect to each navigation link of each web page in the queue beginning with the source page:
if the web page that the navigation link points to and the web page in interest are in the same web pages collection, adding the anchor text corresponding to the navigation link and the title of the web page that the navigation link points to the navigation path of the web page in interest, adding the web page that the navigation link points to the queue of the web pages collection to which the web page in interest belongs, and returning to step (c) with respect to the next navigation link of the web page in interest; otherwise
if the web page that the navigation link points to and the web page in interest are not in the same web pages collection, adding the anchor text corresponding to the navigation link and the title of the web page that the navigation link points to the navigation path of the web page in interest, and returning to step (b) to create a queue for the web pages collection to which the web page that the navigation link points to belongs, and searching the index page of the web pages collection as a source page to repeat the processing of step (c).

9. A system for web pages filtering, comprising:
a web page obtaining means for obtaining all web pages in one or more web pages collections;
a link information collecting means for collecting information of the links among the obtained web pages;
a navigation path extracting means for extracting, based on the collected links, a set of navigation paths of each of the obtained web pages, wherein a navigation path of the set of navigation paths is denoted as context of a web page for indexing and includes a list of combination of URLs, anchors and web page titles for web pages on the navigation path; and
a web page filtering means for filtering the obtained web pages based on the extracted set of navigation paths to obtain desired web pages, wherein the navigation path extracting means is configured for:
(a) selecting a web page from the obtained web pages;
(b) creating a web pages queue for the web pages collection to which the selected web page belongs, and searching the index page of the web pages collection as a source page in the queue; and
(c) with respect to each link of each web page in the queue beginning with the source page:
if the web page that the link points to and the web page in interest are in the same web pages collection, determining whether the web page that the link points to has already existed in the queue of the web pages collection,
if the web page that the link points to is not in the queue of the web pages collection, adding the anchor text corresponding to the link and the title of the web page that the link points to the navigation path of the web page in interest,
if the web page that the link points to is already in the queue of the web pages collection, returning to step (c) to consider the next link of the web page in interest; otherwise
if the web page that the link points to and the web page in interest are not in the same web pages collection, adding the anchor text corresponding to the link and the title of the web page that the link points to the navigation path of the web page in interest, and returning to step (b) to create a queue for the web pages collection to which the web page that the link points to belongs, and searching the index page of the web pages collection as a source page to repeat the processing of step (c).

10. A system for web pages filtering, comprising:
a web page obtaining means for obtaining all web pages in one or more web pages collections;
a link information collecting means for collecting information of the links among the obtained web pages;
a navigation path extracting means for extracting, based on the collected links, a set of navigation paths of each of the obtained web pages, wherein a navigation path of the set of navigation paths is denoted as context of a web page for indexing and includes a list of combination of URLs, anchors and web page titles for web pages on the navigation path; and
a web page filtering means for filtering the obtained web pages based on the extracted set of navigation paths to obtain desired web pages,
wherein the web pages filtering is a subject relevant web pages filtering, and the system further comprises:
a subject inputting means coupled to the web page filtering means for inputting a predetermined subject, and wherein the web page filtering means filters, according to the predetermined subject, the obtained web pages based on the extracted set of navigation paths to obtain the desired web pages,
wherein the web page filtering means is configured for:
selecting subject relevant ontology terms and subject irrelative ontology terms according to the predetermined subject;
for each of the web pages, determining, according to the selected subject relevant ontology terms and subject irrelative ontology terms, whether the web page is a definite subject relevant page or a definite subject irrelative page;

saving all the definite subject relevant pages as the desired web pages and rejecting all the definite subject irrelative pages; and for each of the other web pages, which is neither a definite subject relevant page nor a definite subject irrelative page:

if the web page cannot be navigated from any definite subject relevant page through the navigation paths, rejecting the Web page; otherwise regarding the web page as a candidate page, if the shortest distance between the candidate page and any definite subject relevant page through the navigation paths is shorter than a predetermined threshold, saving the web page as the desired web pages; otherwise regarding the web page as a pending page;

if the pending page can be navigated from any definite subject irrelative page through the navigation paths, rejecting the web page; otherwise saving the web page as the desired web pages.

\* \* \* \* \*